United States Patent
Jeong et al.

(10) Patent No.: US 11,725,145 B2
(45) Date of Patent: Aug. 15, 2023

(54) COATING-TYPE POLARIZING FILM USING DIACETYLENE-BASED LYOTROPIC LIQUID CRYSTAL MIXTURE CONTAINING IODINES, AND MANUFACTURING METHOD THEREFOR

(71) Applicant: INDUSTRIAL COOPERATION FOUNDATION CHONBUK NATIONAL UNIVERSITY, Jeollabuk-do (KR)

(72) Inventors: Kwang Un Jeong, Jeollabuk-do (KR); Yu Jin Choi, Jeollabuk-do (KR); Seohee Park, Jeollabuk-do (KR)

(73) Assignee: INDUSTRIAL COOPERATION FOUNDATION CHONBUK NATIONAL UNIVERSITY, Jeollabuk-Do (KR)

( * ) Notice: Subject to any disclaimer, the term of this patent is extended or adjusted under 35 U.S.C. 154(b) by 107 days.

(21) Appl. No.: 17/285,620

(22) PCT Filed: Apr. 17, 2019

(86) PCT No.: PCT/KR2019/004640
§ 371 (c)(1),
(2) Date: Apr. 15, 2021

(87) PCT Pub. No.: WO2020/080625
PCT Pub. Date: Apr. 23, 2020

(65) Prior Publication Data
US 2021/0395612 A1    Dec. 23, 2021

(30) Foreign Application Priority Data

Oct. 15, 2018 (KR) .................. 10-2018-0122604

(51) Int. Cl.
| | |
|---|---|
| C09K 19/38 | (2006.01) |
| C08F 2/48 | (2006.01) |
| C08F 38/02 | (2006.01) |
| C09K 19/34 | (2006.01) |
| C09K 19/42 | (2006.01) |

(52) U.S. Cl.
CPC ............... *C09K 19/38* (2013.01); *C08F 2/48* (2013.01); *C08F 38/02* (2013.01); *C09K 19/348* (2013.01); *C09K 19/42* (2013.01)

(58) Field of Classification Search
CPC ...... C09K 19/38; C09K 19/348; C09K 19/42; C09K 19/061; C09K 19/02
See application file for complete search history.

(56) References Cited

U.S. PATENT DOCUMENTS

| | | | |
|---|---|---|---|
| 6,312,618 B1 | 11/2001 | Wu et al. | |
| 9,139,774 B2 * | 9/2015 | Arakawa | ............ C09K 19/3804 |
| 2013/0324684 A1 | 12/2013 | Arajawa et al. | |
| 2021/0395612 A1 * | 12/2021 | Jeong | ........................ C09D 5/22 |

FOREIGN PATENT DOCUMENTS

| | | | | |
|---|---|---|---|---|
| JP | 3646884 B2 * | 5/2005 | ............ | C09K 19/18 |
| KR | 10-0781599 B1 | 12/2007 | | |
| KR | 10-2008-0005357 A | 1/2008 | | |
| KR | 10-0962543 | 6/2010 | | |
| KR | 10-2017-0051223 A | 5/2017 | | |

OTHER PUBLICATIONS

Choi et al., "Transfer and Amplification of Iodine-Based Diacetylene Amphiphiles to Anisotropic Optical Properties by Uniaxial Orientation in Thin Films", ACS Appl. Mater. Interfaces 2021, 13, 19, 22884-22890 (Year: 2021).*
International Search Report for PCT/KR2019/004640 dated Aug. 8, 2019.
Jenkins I. H. et al., "Synthesis and Optical Characterization of Polydiacetylenes Containing Carboxylic Acid, Carbamate, Phosphonium and Quaternary Ammonium Functionalities" Macromolecules, vol. 29 (20), pp. 6365-6370, 1996.
D. W. Britt et al., "Influence of Substrate Properties on the Topochemical Polymerization of Diacetylene Monolayers", Langmuir, vol. 17, pp. 3757-3765, 2001.

* cited by examiner

*Primary Examiner* — Geraldina Visconti
(74) *Attorney, Agent, or Firm* — The PL Law Group, PLLC

(57) ABSTRACT

A diacetylene-based lyotropic liquid crystal mixture according to an embodiment includes by mixing diacetylene-based compounds containing iodide and triiodide Chemical Formula 1 and Chemical Formula 2. The lyotropic liquid crystal mixture may be prepared by synthesizing an $[X]\text{---}C\text{---}R_m\text{-}[D]\text{-}R_n$ compound, synthesizing an $[A^+X^-]\text{---}C\text{---}R_m\text{-}D\text{-}R_n$ compound, and synthesizing an $[A^+B^-]\text{---}C\text{---}R_m\text{-}D\text{-}R_n$ compound. A thin polarizing film may be prepared through simple coating of a lyotropic liquid crystal mixture prepared by mixing diacetylene-based compounds containing iodide and triiodide.

11 Claims, 9 Drawing Sheets

COATING-TYPE POLARIZING FILM USING DIACETYLENE-BASED LYOTROPIC LIQUID CRYSTAL MIXTURE CONTAINING IODINES, AND MANUFACTURING METHOD THEREFOR

PRIORITY

This application claims benefit under 35 U.S.C. 119(e), 120, 121, or 365(c), and is a National Stage entry from International Application No. PCT/KR2019/004640, filed Apr. 17, 2019, which claims priority to the benefit of Korean Patent Application No. 10-2018-0122604 filed in the Korean Intellectual Property Office on Oct. 15, 2018, the entire contents of which are incorporated herein by reference.

BACKGROUND

Technical Field

The present disclosure relates to a coating-type polarizing film using diacetylene-based lyotropic liquid crystal mixture containing iodine and a method for manufacturing the same, more particularly to a method for manufacturing a thin polarizing film through simple coating of a lyotropic liquid crystal mixture prepared by mixing diacetylene-based compounds containing iodide and triiodide.

Background Art

A linear polarizing film polarizes unpolarized light from a light source into light oscillating in only one direction by absorbing or reflecting light except for the specific direction. Therefore, the linear polarizing film is used as an essential component of allowing an LCD that lacks the ability to emit light on its own as a display by blocking or passing the light of a specific direction from a backlight.

Until now, LCDs (liquid crystal displays) are mainly used for medium- to large-sized displays such as TVs and computer monitors, and with the trend toward thinner LCDs, research is continuously being made to manufacture thinner polarizing films.

The currently commercially available polarizing film is manufactured by doping iodine or a dichroic dye in polyvinyl alcohol (PVA) and obtaining a film through a post-processing process such as melt extrusion, etc.

The dichroic dye refers to a material which show anisotropic absorption of light depending on the propagation direction. It can provide polarizability to the film because it selectively absorbs only one polarized component and passes other polarized components. In general, as the dichroic dye, iodine which exhibits superior optical properties such as polarization efficiency, transmittance, etc. is frequently used. However, because iodine is highly sublimable, the durability of a film may decrease in high-temperature, high-humidity environments. To make up for this, a multilayered structure of 6 or more layers including a triacetyl cellulose (TAC) film and an adhesive PVA film is used.

After forming PVA film, a drawing process is necessary for the orientation of iodine. If the thickness of the film is tens of micrometers or smaller before the drawing, the film may be fractured. Therefore, there is a limitation in reducing the thickness of the PVA polarizing film.

To overcome this limitation, a coating-type polarizing film using a dichroic dye has been studied consistently. Since the dichroic dye used in the coating-type polarizing film cannot absorb all visible light, two or more dyes are mixed or deposited in many cases. However, when different dyes are mixed or deposited, the film stability may be unsatisfactory due to the phase separation of the different dyes.

SUMMARY

The present disclosure is directed to providing a new molecular structure capable of stabilizing highly sublimable iodine.

The present disclosure is also directed to providing a diacetylene-based compound as a dichroic dye, which contains triiodide and is cable of absorbing visible light in a range of 300-400 nm.

The present disclosure is also directed to providing a polydiacetylene, which is a conjugated polymer which has increased stability and is cable of absorbing visible light in a broad range of 400-800 nm.

The present disclosure is also directed to providing a method for manufacturing a polarizing film through coating of a lyotropic liquid crystal mixture prepared by mixing diacetylene-based compounds containing iodide and triiodide.

The present disclosure is also directed to providing a thin polarizing film which requires no additional PVA film or TAC film because it has high adhesivity.

The present disclosure provides a diacetylene-based lyotropic liquid crystal mixture including Chemical Formula 1 and Chemical Formula 2:

$$[A^+B^-]\text{-}C\text{-}R_m\text{-}[\text{-}D\text{-}]\text{-}R_n \qquad \text{[Chemical Formula 1]}$$

wherein $A^+$ is a linear or cyclic cationic compound, $B^-$ is a halogen-, carbon-, nitrogen-, phosphorus, boron- or oxygen-containing anionic compound, C is a $C_{1\text{-}3}$ linear compound with some atoms optionally substituted with oxygen or nitrogen, D is a diacetylene-based compound, and $R_m$ or $R_n$ is a $C_{1\text{-}20}$ linear compound, and $$R_m\text{-}[\text{-}D\text{-}]\text{-}R_n \qquad \text{[Chemical Formula 2]}$$

wherein D is a diacetylene-based compound, and $R_m$ or $R_n$ is a $C_{1\text{-}20}$ linear compound.

The compound $A^+$ may have a structure of Chemical Formulas 3-31.

[Chemical Formula 3]

[Chemical Formula 4]

[Chemical Formula 5]

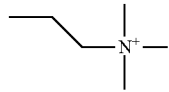

[Chemical Formula 6]

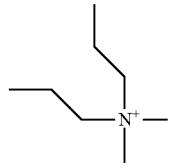

[Chemical Formula 7]

[Chemical Formula 8]

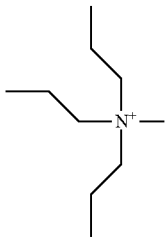

[Chemical Formula 9]

[Chemical Formula 10]

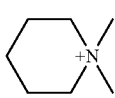

[Chemical Formula 11]

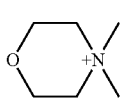

[Chemical Formula 12]

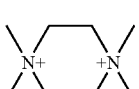

[Chemical Formula 13]

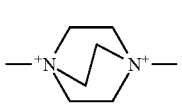

[Chemical Formula 14]

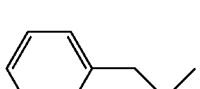

[Chemical Formula 15]

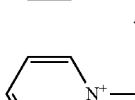

[Chemical Formula 16]

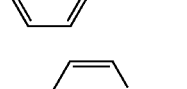

[Chemical Formula 17]

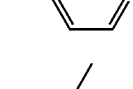

[Chemical Formula 18]

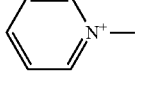

[Chemical Formula 19]

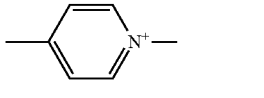

[Chemical Formula 20]

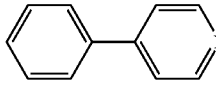

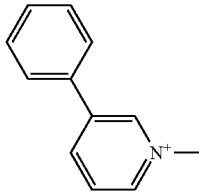

[Chemical Formula 21]

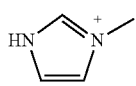

[Chemical Formula 22]

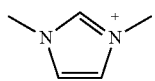

[Chemical Formula 23]

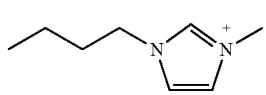

[Chemical Formula 24]

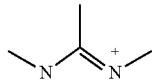

[Chemical Formula 25]

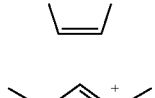

[Chemical Formula 26]

[Chemical Formula 27]

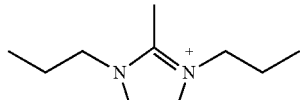

[Chemical Formula 28]

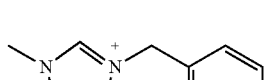

[Chemical Formula 29]

[Chemical Formula 30]

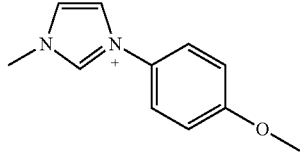

[Chemical Formula 31]

The $B^-$ may be $Cl^-$, $Br^-$, $I^-$, $COOCF_3^-$, $CH_3SO_3^-$, $PO_4^-$, $OH^-$, $COO^-$, $NO_2^-$, $BF_4^-$ $PF_4^-$, $NTf_2^-$, $I_3^-$, $I_5^-$ or $I_7^-$.

The C may have a structure of Chemical Formulas 33-42.

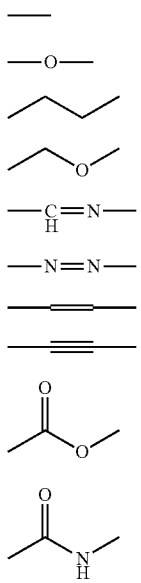

[Chemical Formula 33]
[Chemical Formula 34]
[Chemical Formula 35]
[Chemical Formula 36]
[Chemical Formula 37]
[Chemical Formula 38]
[Chemical Formula 39]
[Chemical Formula 40]
[Chemical Formula 41]
[Chemical Formula 42]

The D may have a structure of Chemical Formulas 43-45.

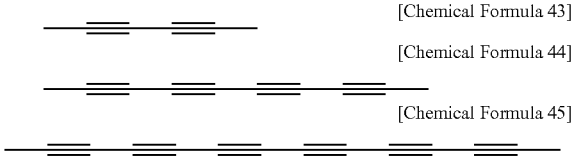

[Chemical Formula 43]
[Chemical Formula 44]
[Chemical Formula 45]

The present disclosure also provides a method for preparing the lyotropic liquid crystal mixture, which includes:

(a) a step of synthesizing an [X]—C—$R_m$-[D]-$R_n$ compound by reacting a C—$R_m$-[D]-$R_n$ compound including (i) a diacetylene compound (D), (ii) a $C_{1-20}$ linear compound ($R_m$ or $R_n$) and (iii) a functional group containing COOH or OH (C) and a halogen compound ($X_2$) which is $F_2$, $Cl_2$, $Br_2$ or $I_2$ at a molar ratio of 1:10;

(b) a step of synthesizing an $[A^+X^-]$—C—$R_m$-D-$R_n$ compound by reacting the X of the [X]—C—$R_m$-[D]-$R_n$ compound with a nitrogen-containing linear or cyclic compound (A) at a molar ratio of 1:5; and (c) a step of synthesizing an $[A^+X^-]$—C—$R_m$-D-$R_n$ compound by reacting the $X^-$ of the $[A^+X^-]$—C—$R_m$-D-$R_n$ compound with a halogen compound ($B_2$) which is $F_2$, $Cl_2$, $Br_2$ or $I_2$ at a molar ratio of 1:5.

The present disclosure also provides a coating-type polarizing film composition which contains the lyotropic liquid crystal mixture.

The coating-type polarizing film composition may contain 60-90 parts by weight of a diacetylene-based compound containing iodide, 1-30 parts by weight of a diacetylene-based compound containing triiodide and 1-20 parts by weight of a liquid diacetylene-based compound.

The diacetylene-based compound containing iodide may absorb visible light in a wavelength range of 1-200 nm, the diacetylene-based compound containing triiodide may absorb visible light in a wavelength range of 300-400 nm, and the coating-type polarizing film composition may absorb visible light in a wavelength range of 300-800 nm.

The coating-type polarizing film composition may be a smectic liquid crystal.

The present disclosure also provides a polydiacetylene, which is a conjugated polymer, formed by polymerizing the coating-type polarizing film composition using 254-nm ultraviolet light.

A coating-type polarizing film according to the present disclosure can solve the problem of iodine sublimation of the existing polarizing film due to a newly synthesized compound capable of stabilizing the highly sublimable iodine.

A diacetylene-based compound containing triiodide absorbs visible light in a range of 300-400 nm, and diacetylene-based compounds containing iodide and triiodide have superior solubility for the liquid diacetylene-based compound and can form a smectic liquid crystal at room temperature.

In addition, a lyotropic liquid crystal mixture according to the present disclosure form a polydiacetylene, which is a conjugated polymer, after polymerization, which stabilizes a film and at the same time can absorb visible light in a range of 400-800 nm.

Accordingly, the lyotropic liquid crystal mixture according to the present disclosure can be used to prepare a polarizing film capable of absorbing or passing visible light with a wavelength of 300-800 nm.

In addition, since the lyotropic liquid crystal mixture has high adhesivity for polymer or glass surface, a polarizing film can be prepared without mixing of additional materials or use of an additional film.

DETAILED DESCRIPTION

Figure 1:
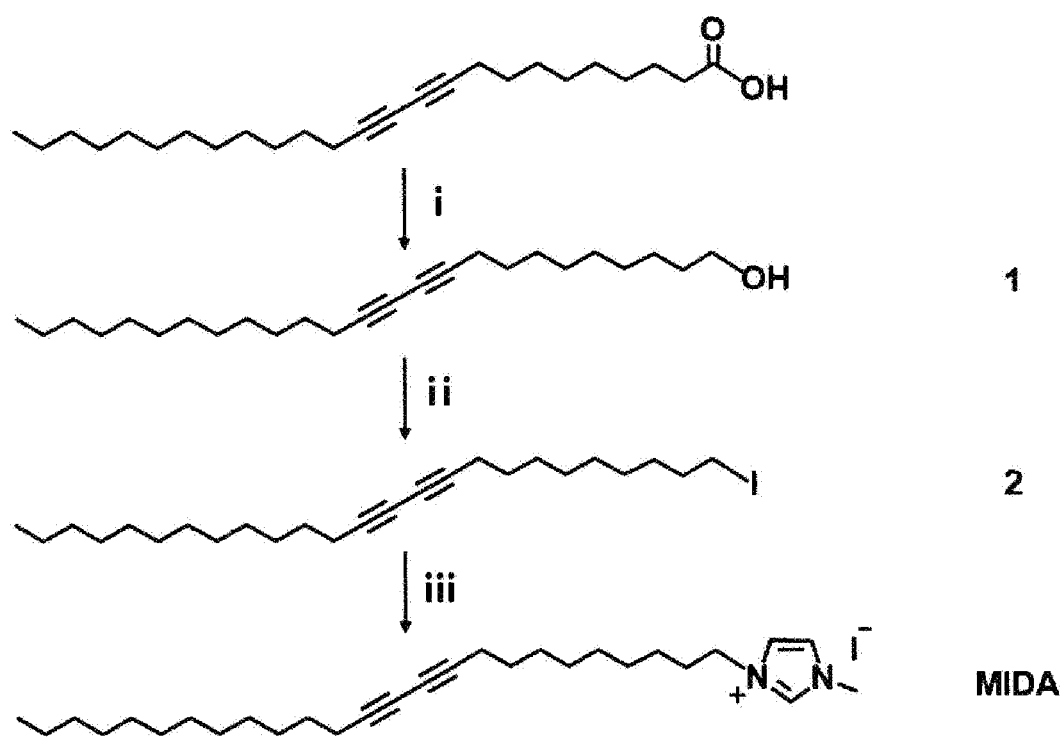
FIG. 1 shows a process of synthesizing MIDA as an example of a diacetylene-based compound containing iodide according to an exemplary embodiment of the present disclosure.

Hereinafter, specific exemplary embodiments of the present disclosure are described in detail. When describing the present disclosure, a detailed description of known technology will be omitted when such a description may obscure the subject matter of the present disclosure. Throughout the specification, when a certain portion "includes" a certain component, this indicates that other components are not excluded and may be further included unless specified otherwise.

Since the present disclosure may be modified in various manners and may have various exemplary embodiments, specific exemplary embodiments will be described in detail. However, the exemplary embodiments are not intended to limit the present disclosure to the specific exemplary embodiments, and it should be understood that they include all changes, equivalents, and substitutes included within the spirit and scope of the present disclosure.

The terminology used herein is for the purpose of describing particular exemplary embodiments and is not intended to limit the present disclosure.

Singular expressions are intended to include plural expressions as well unless the context clearly indicates otherwise. In the present disclosure, it will be understood that the terms such as include, contain, have, etc. specify the presence of stated features, numbers, steps, operations, elements, components or combinations thereof, but do not preclude the presence, or addition of one or more other features, numbers, steps, operations, elements, components or combinations thereof.

The present disclosure relates to a lyotropic liquid crystal mixture prepared by mixing diacetylene-based compounds containing iodine and a liquid diacetylene-based compound, and a coating-type polarizing film manufactured using the same.

In general, the degree of polarization (DOP) of a polarizing film refers to the intensity of polarized light with respect to incident light. It is an indicator of polarization along with azimuthal angle and polarization angle.

Since the degree of polarization means the difference in light transmittance depending on direction, it may vary depending on film thickness.

If the film thickness is decreased, the degree of polarization is decreased as the total transmittance is increased. And, if the thickness is increased, the degree of polarization is increased as the total transmittance is decreased. Therefore, the degree of polarization should be evaluated based on the transmittance of a sheet of polarizing film. The degree of polarization is calculated according to Equation 1 with $T_s$ being 40%.

$$T_s=(T_{Md}+T_{Td})/2 \quad \text{[Equation 1]}$$

($T_{Td}$=parallel transmittance, $T_{Md}$=cross transmittance)

$$DOP=(T_{Md}-T_{Td})/(T_{Md}+T_{Td})$$

Through photopolymerization, the diacetylene-based compounds used in the present disclosure form a polydiacetylene, which is a conjugated polymer wherein pi-electrons are delocalized along one direction as double bonds and triple bonds are repeated continuously. Therefore, the polymerized polydiacetylene can absorb and pass visible light in a region of 400-800 nm in a specific direction.

The diacetylene-based compound containing triiodide is designed and synthesized with a molecular structure capable of stabilizing iodine and strongly absorbs visible light in a range of 300-400 nm. A mixture obtained by mixing this compound with the diacetylene-based compound containing iodide can express colors in all visible lights after polymerization.

Figure 9:
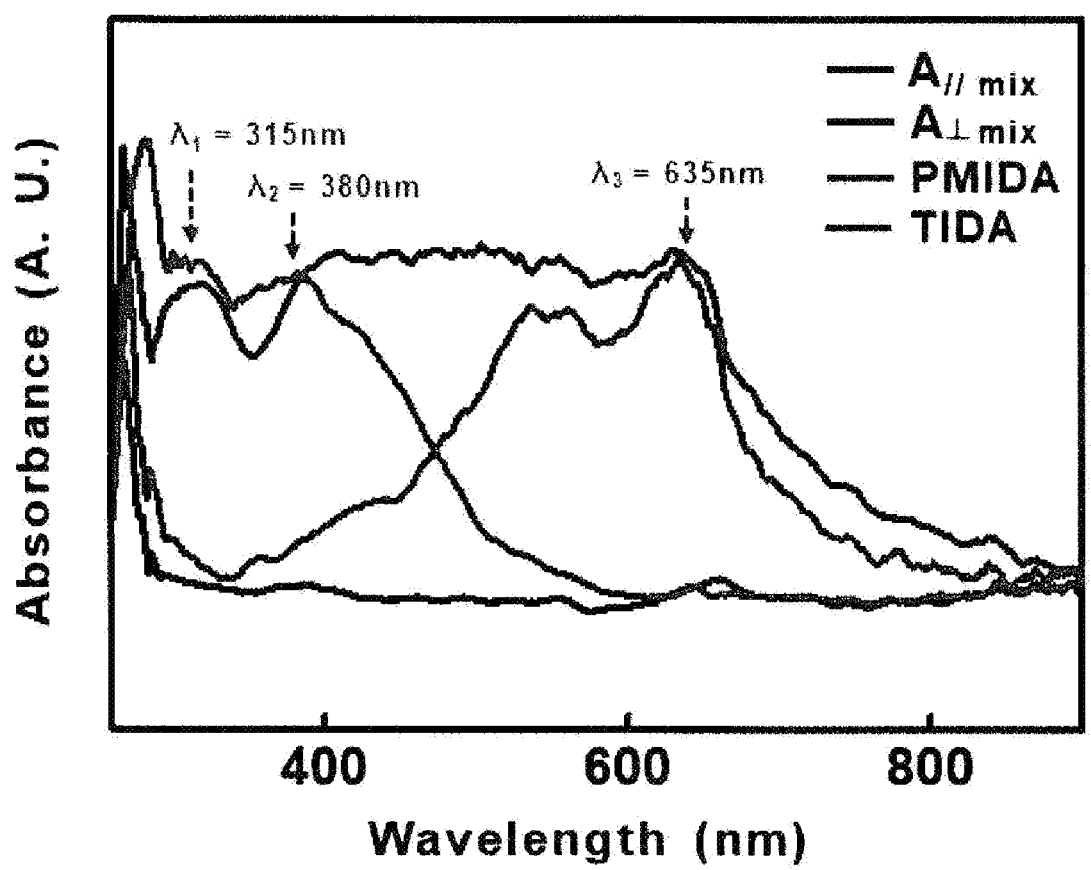
FIG. 9 shows a result of measuring absorption by a polarizing film according to an exemplary embodiment of the present disclosure in the visible light region.

FIG. 9 shows a result of measuring absorption by a polarizing film prepared from the mixture according to an exemplary embodiment of the present disclosure in the visible light region.

A mixture obtained by mixing the compounds at a specific ratio is a lyotropic, smectic liquid crystal which strongly forms layers at room temperature. In general, when shear is applied to a lyotropic liquid crystal, it is easily oriented along the shearing direction. Therefore, a thin polarizing film can be formed easily by coating.

Accordingly, a polarizing film which absorbs and passes visible light in a region of 300-800 nm in a specific direction can be manufactured simply at low cost by using the mixture presented in the present disclosure.

The present disclosure provides a diacetylene-based lyotropic liquid crystal mixture including Chemical Formula 1 and Chemical Formula 2.

$$[A^+B^-]-C-R_m+D+R_n \quad \text{[Chemical Formula 1]}$$

(wherein $A^+$ is a linear or cyclic cationic compound, $B^-$ is a halogen-, carbon-, nitrogen-, phosphorus, boron- or oxygen-containing anionic compound, C is a $C_{1-3}$ linear compound with some atoms optionally substituted with oxygen or nitrogen, D is a diacetylene-based compound, and $R_m$ or $R_n$ is a $C_{1-20}$ linear compound)

$$R_m+D+R_n \quad \text{[Chemical Formula 2]}$$

(wherein D is a diacetylene-based compound, and $R_m$ or $R_n$ is a $C_{1-20}$ linear compound)

In Chemical Formula 1, $A^+$ is a linear or cyclic ionic compound, $B^-$ is a counterion, C is a functional group or an alkyl group, each of $R_m$ and Ra is a flexible $C_{1-20}$ chain group, and D is a photopolymerizable diacetylene-based compound.

The compound $A^+$ may have a structure of Chemical Formulas 3-31.

[Chemical Formula 3]

[Chemical Formula 4]

[Chemical Formula 5]

[Chemical Formula 6]

[Chemical Formula 7]

-continued

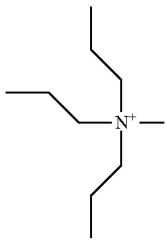

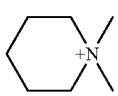

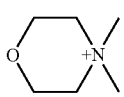

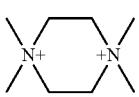

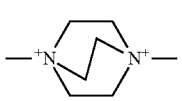

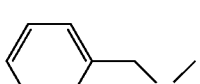

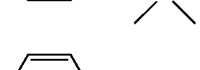

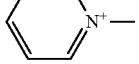

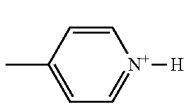

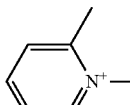

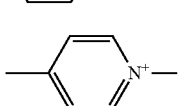

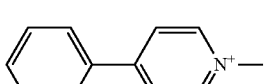

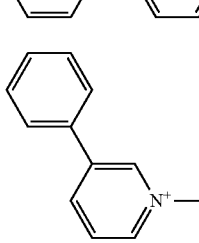

[Chemical Formula 8]

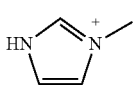

[Chemical Formula 9]

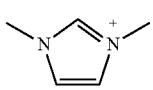

[Chemical Formula 10]

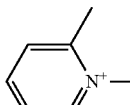

[Chemical Formula 11]

[Chemical Formula 12]

[Chemical Formula 13]

[Chemical Formula 14]

[Chemical Formula 15]

[Chemical Formula 16]

[Chemical Formula 17]

[Chemical Formula 18]

[Chemical Formula 19]

[Chemical Formula 20]

[Chemical Formula 21]

[Chemical Formula 22]

[Chemical Formula 23]

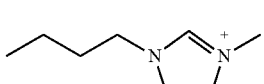

[Chemical Formula 24]

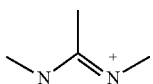

[Chemical Formula 25]

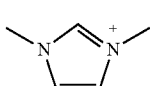

[Chemical Formula 26]

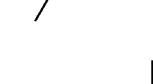

[Chemical Formula 27]

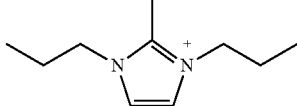

[Chemical Formula 28]

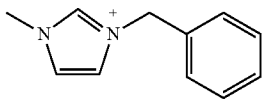

[Chemical Formula 29]

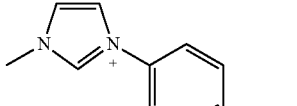

[Chemical Formula 30]

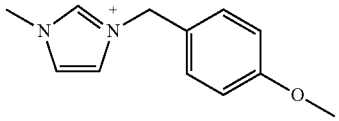

[Chemical Formula 31]

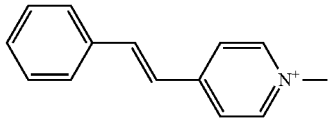

The $B^-$ may be $Cl^-$, $Br^-$, $I^-$, $COOCF_3^-$, $CH_3SO_3^-$, $PO_4^-$, $OH^-$, $COO^-$, $NO_2^-$, $BF_4^-$ $PF_4^-$, $NTf_2^-$, $I_3^-$, $I_5^-$ or $I_7^-$.

The C may have a structure of Chemical Formulas 33-42.

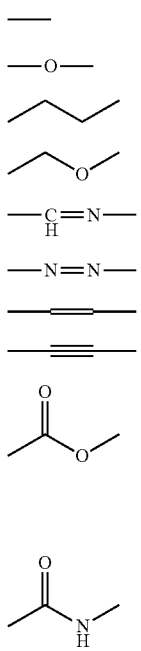

[Chemical Formula 33]

[Chemical Formula 34]

[Chemical Formula 35]

[Chemical Formula 36]

[Chemical Formula 37]

[Chemical Formula 38]

[Chemical Formula 39]

[Chemical Formula 40]

[Chemical Formula 41]

[Chemical Formula 42]

The D may have a structure of Chemical Formulas 43-45.

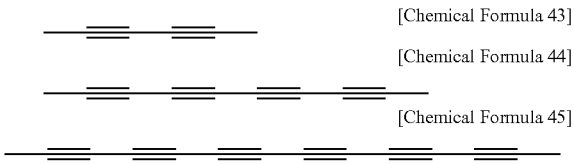

[Chemical Formula 43]

[Chemical Formula 44]

[Chemical Formula 45]

In an exemplary embodiment of the present disclosure, Chemical Formula 46 represents a diacetylene-based compound containing iodide (MIDA), and Chemical Formula 47 represents a diacetylene-based compound containing triiodide (TIDA).

In an exemplary embodiment of the present disclosure, Chemical Formula 48 represents a liquid compound used form the lyotropic liquid crystal mixture.

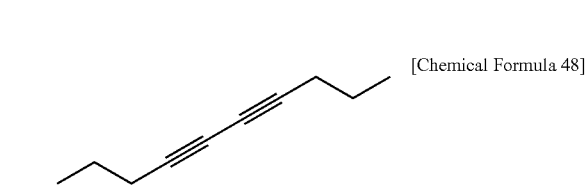

[Chemical Formula 48]

The present disclosure also provides a method for preparing the lyotropic liquid crystal mixture, which includes:

(a) a step of synthesizing an [X]—C—$R_m$-[D]-$R_n$ compound by reacting a C—$R_m$-[D]-$R_n$ compound including (i) a diacetylene compound (D), (ii) a $C_{1-20}$ linear compound ($R_m$ or $R_n$) and (iii) a functional group containing COOH or OH (C) and a halogen compound ($X_2$) which is $F_2$, $Cl_2$, $Br_2$ or $I_2$ at a molar ratio of 1:10;

(b) a step of synthesizing an [$A^+X^-$]—C—$R_m$-D-$R_n$ compound by reacting the X of the [X]—C—$R_m$-[D]-$R_n$ compound with a nitrogen-containing linear or cyclic compound (A) at a molar ratio of 1:5; and (c) a step of synthesizing an [$A^+B^-$]—C—$R_m$-D-$R_n$ compound by reacting the $X^-$ of the [$A^+X^-$]—C—$R_m$-D-$R_n$ compound with a halogen compound ($B_2$) which is $F_2$, $Cl_2$, $Br_2$ or I2 at a molar ratio of 1:5.

The present disclosure also provides a coating-type polarizing film composition containing the lyotropic liquid crystal mixture.

The coating-type polarizing film composition may contain 60-90 parts by weight of a diacetylene-based compound containing iodide, 1-30 parts by weight of a diacetylene-based compound containing triiodide and 1-20 parts by weight of a liquid diacetylene-based compound.

The diacetylene-based compound containing iodide may absorb visible light in a wavelength range of 1-200 nm, the diacetylene-based compound containing triiodide may absorb visible light in a wavelength range of 300-400 nm, and the coating-type polarizing film composition may absorb visible light in a wavelength range of 300-800 nm.

The coating-type polarizing film composition may be a smectic liquid crystal.

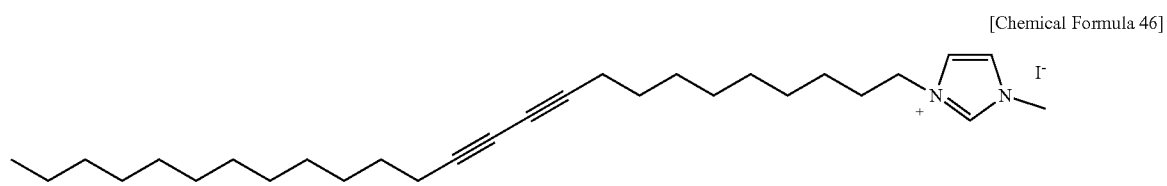

[Chemical Formula 46]

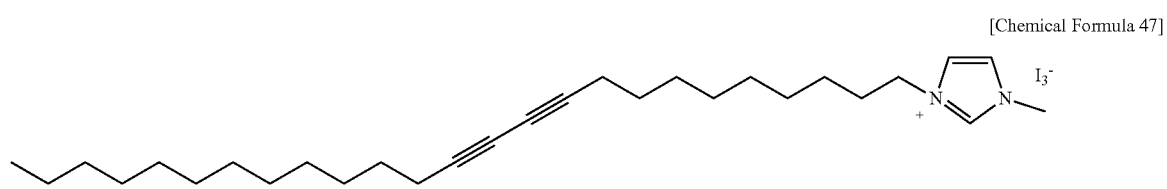

[Chemical Formula 47]

The present disclosure also provides a polydiacetylene, which is a conjugated polymer formed from polymerization of the coating-type polarizing film composition using 254-nm ultraviolet ray.

Hereinafter, specific examples of the present disclosure will be described referring to the attached drawings, so that those having ordinary knowledge in the art can easily carry out the present disclosure. When describing the present disclosure, a detailed description of known function or constitution will be omitted when such a description may obscure the subject matter of the present disclosure. And, some elements in the drawings are exaggerated, reduced or simplified for ease of explanation, and the drawings and their components are not necessarily drawn in proper portion. However, those skilled in the art will easily understand these particulars.

Example 1

A process of synthesizing diacetylene-based compounds containing iodide (MIDA) and triiodide (TIDA) represented by Chemical Formula 5 is shown in FIG. 1.

First, 10,12-pentacosadiynoic acid (0.5 g, 1.3 mmol) and lithium aluminum hydride (0.1 g, 2.6 mmol) were mixed in purified diethyl ether in a 25-mL round-bottom flask. After stirring the mixture at room temperature for 4 hours and adding an excess amount of diethyl ether, the mixture was neutralized by adding a small amount of aqueous HCl solution. After extracting the reaction product using ethyl acetate (EA), the solvent was evaporated completely. After purifying the product by column chromatography using a 50:1 mixture of methylene chloride (MC) and methanol as an eluent, 10,12-pentacosadiyn-1-ol was synthesized as a white solid by recrystallizing from ethyl acetate (EA).

Next, the synthesized white 10,12-pentacosadiyn-1-ol solid was dissolved in methylene chloride (MC) in a 25 mL round-bottom flask. After cooling the mixture to 0° C., imidazole, iodine and adenosine triphosphate were slowly added to the solution. After heating to room temperature and stirring for 2 hours, the reaction product was neutralized by adding aqueous NaHCO$_3$ solution. After extracting the product using methylene chloride (MC), the solvent was evaporated completely. After purifying the product by column chromatography using a 1:10 mixture of hexane and ethyl acetate (EA) as an eluent, 10,12-pentacosadiyn-1-iodide was synthesized as a white solid by recrystallizing from ethanol.

After dissolving the synthesized 10,12-pentacosadiyn-1-iodide in a 1:3 (v/v) mixture of acetonitrile and chloroform as a solvent, 1-methylimidazole was added slowly. After refluxing the mixture at 80° C. for 2 days, the temperature was lowered to room temperature. After completely evaporating the solvent, the reaction product was purified by column chromatography using a 10:1 mixture of methylene chloride and methanol as an eluent, and 1-(10,12-pentacosadiyn-1-yl)imidazolium iodide (MIDA) was synthesized as a yellow precipitate by precipitating with diethyl ether.

Thereafter, the 1-(10,12-pentacosadiyn-1-yl)imidazolium iodide (MIDA) was dissolved in methylene chloride (MC) and iodine was added. After stirring the reaction mixture at room temperature for 1 hour, the solvent was evaporated completely. 1-(10,12-Pentacosadiyn-1-yl)imidazolium triiodide (TIDA) of gold color was synthesized by precipitating the reaction product using an excess amount of hexane.

Example 2

Figure 7:
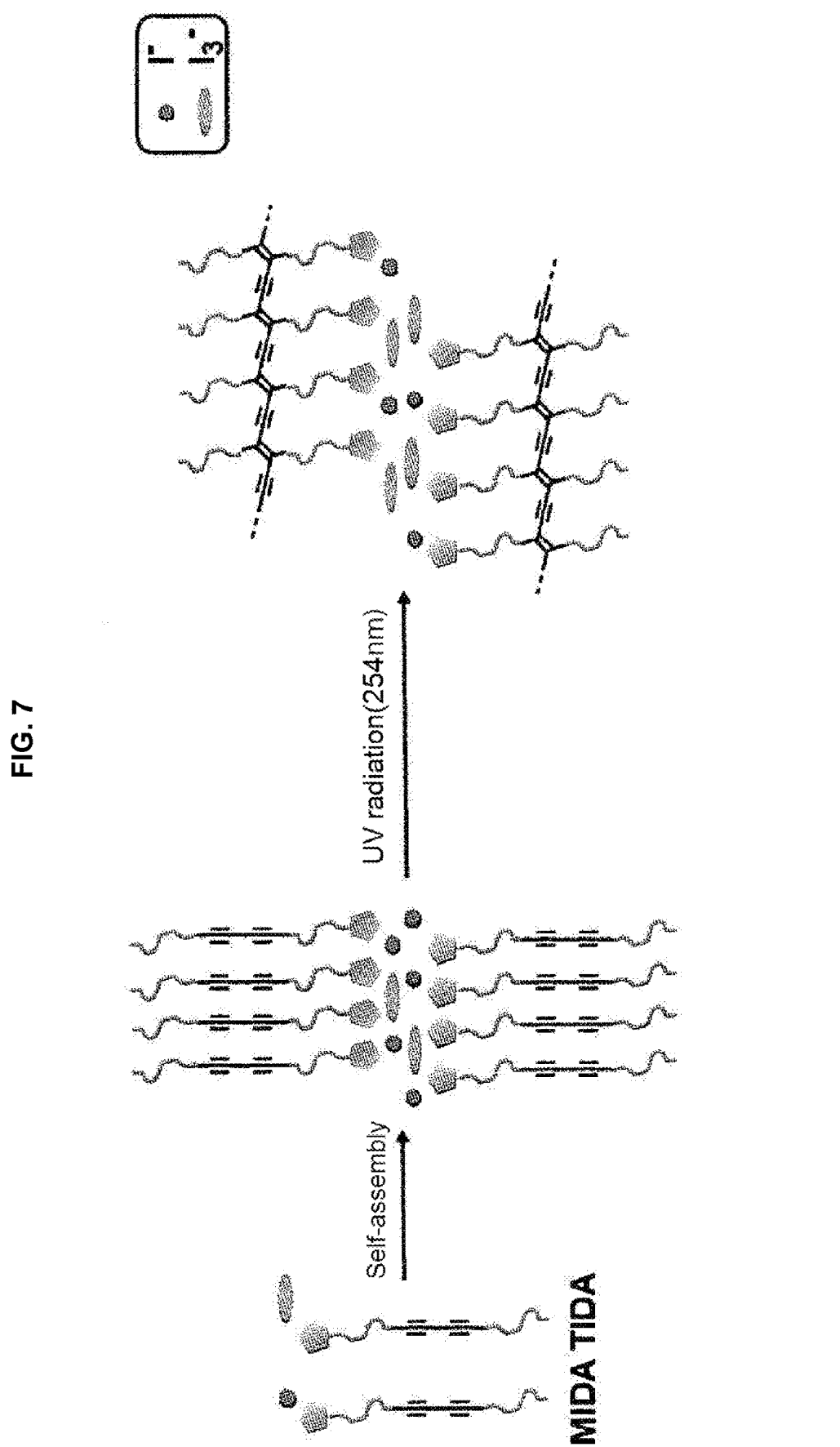
FIG. 7 shows the self-assembly and polymerization processes of diacetylene-based compounds containing iodine according to an exemplary embodiment of the present disclosure.
Figure 8:
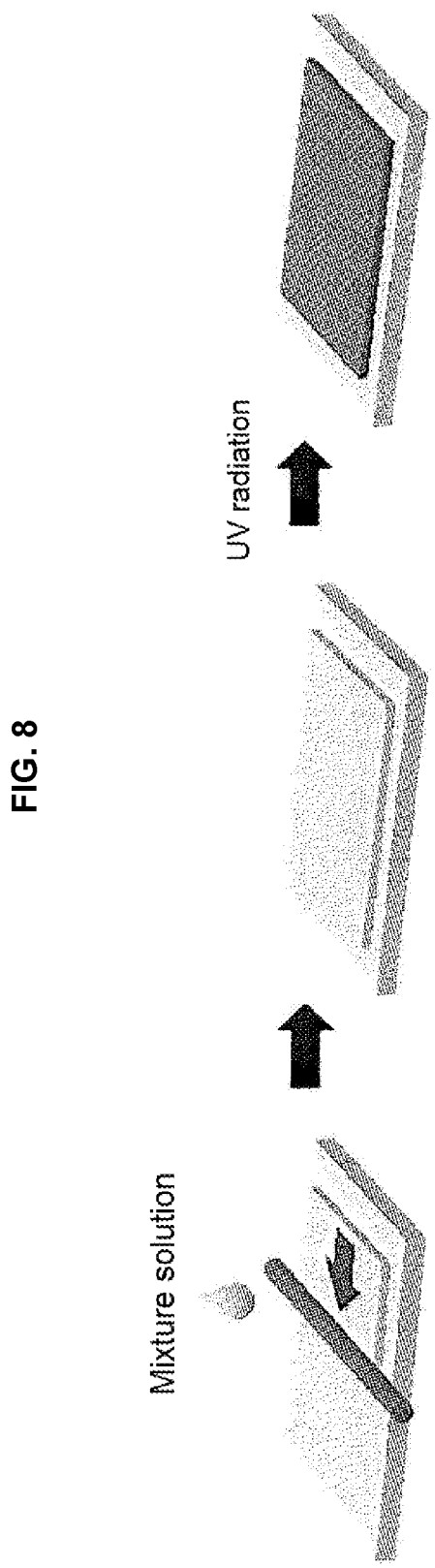
FIG. 8 briefly shows a process of preparing a polarizing film according to an exemplary embodiment of the present disclosure.

The diacetylene-based compounds containing iodide and triiodide, 4,6-decadiyne (Chemical Formula 48) prepared in Example 1 was mixed with a liquid diacetylene-based compound at a weight ratio of 7:2:1. The mixture, which was a smectic liquid crystal at room temperature, was applied on a polymer or glass plate and then crystallized by applying shear force. A thin polarizing film was obtained by curing the composition by irradiating 245-nm ultraviolet ray for 5 minutes (see FIG. 7 and FIG. 8).

Test Example 1

Figure 2:
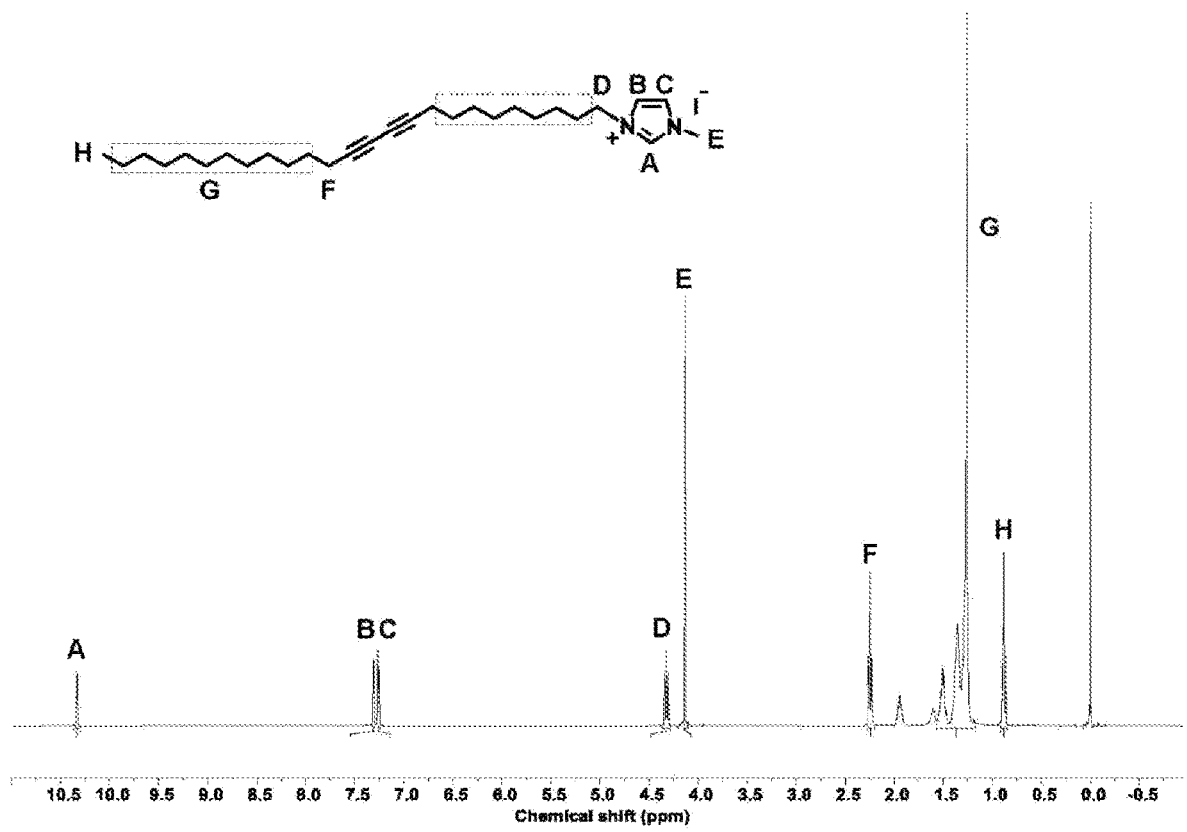
FIG. 2 shows the $^1$H-NMR analysis result of MIDA as an example of a diacetylene-based compound containing iodide according to an exemplary embodiment of the present disclosure.
Figure 3:
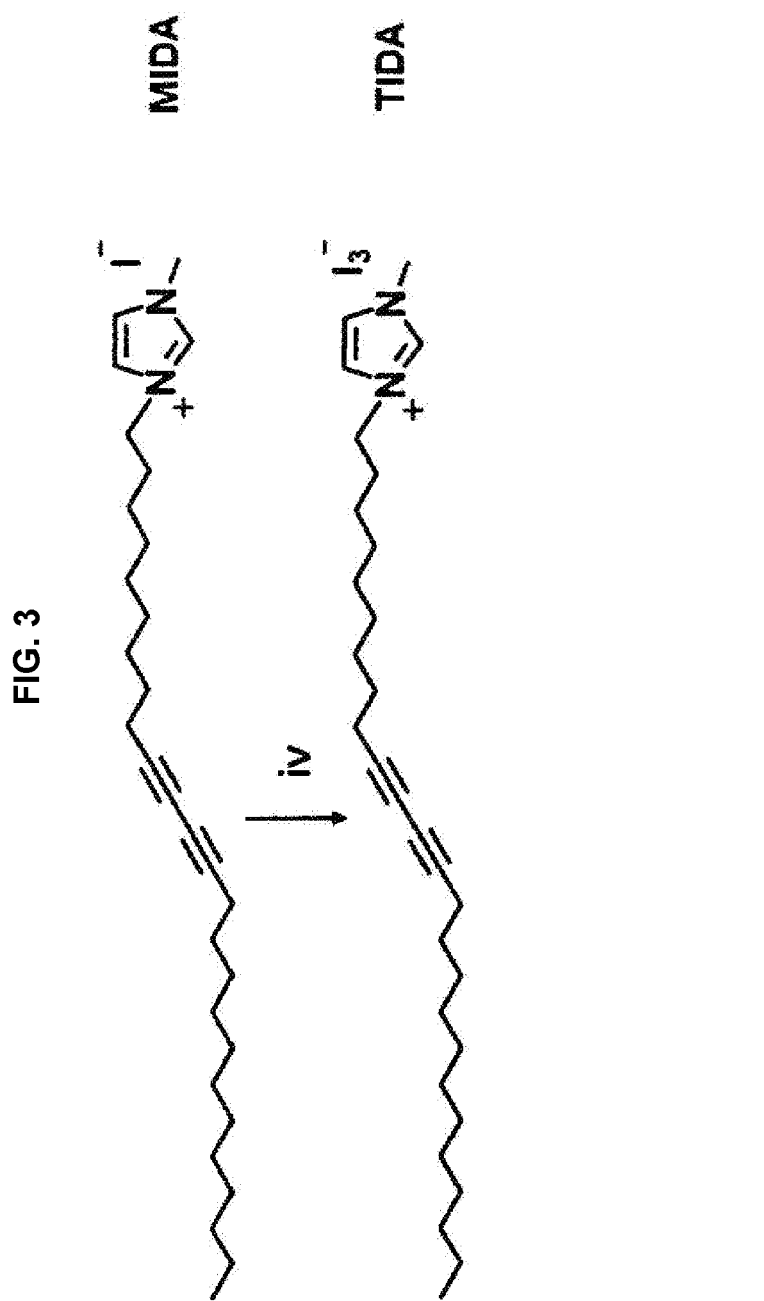
FIG. 3 shows a process of synthesizing TIDA as an example of a diacetylene-based compound containing triiodide according to an exemplary embodiment of the present disclosure.

The $^1$H-NMR analysis result of the MIDA prepared in Example 1 is shown in FIG. 2. The NMR analysis result of FIG. 2 is as follows.

$^1$H-NMR (400 MHz, CHCl$_3$): δ=10.3 (s, 1H), 7.3 (t, 1H), 7.2 (t, 1H), 4.3 (t, 2H), 4.1 (s, 3H), 2.2 (t, 4H), 1.2-1.6 (m, 34H), 0.8 (t, 3H).

Figure 4:
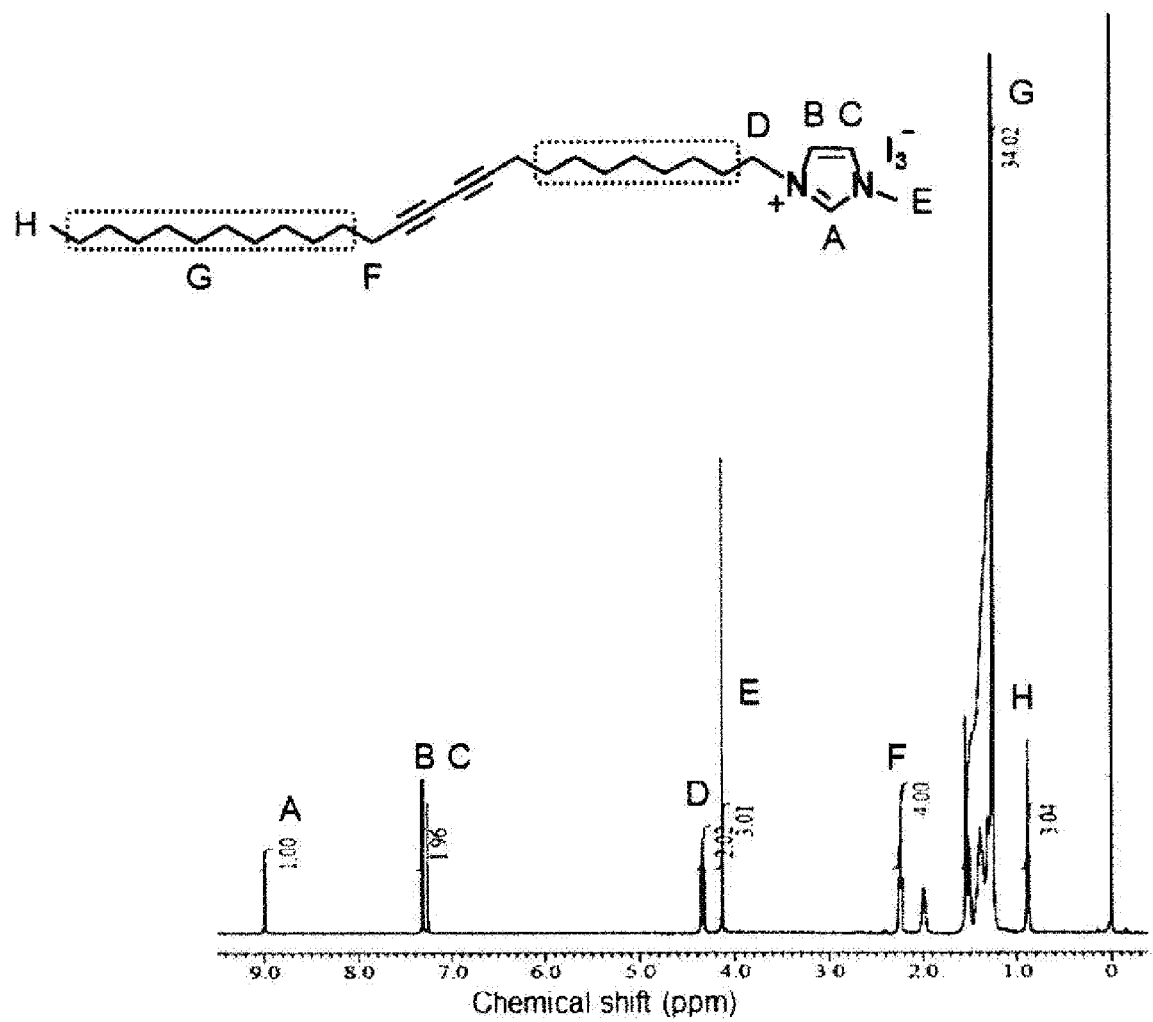
FIG. 4 shows the $^1$H-NMR analysis result of TIDA as an example of a diacetylene-based compound containing triiodide according to an exemplary embodiment of the present disclosure.
Figure 5:
FIG. 5 shows an example of a diacetylene-based compound, which is liquid at room temperature, used to form a mixture according to an exemplary embodiment of the present disclosure.
Figure 6:
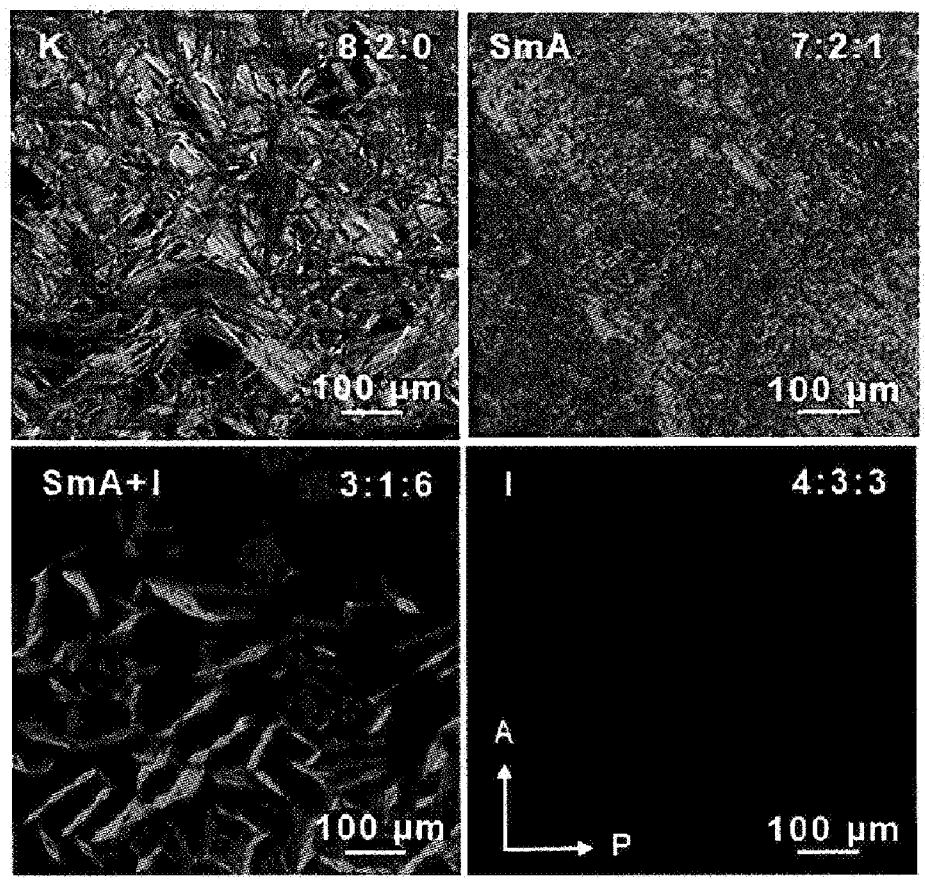
FIG. 6 shows a result of mixing compounds according to an exemplary embodiment of the present disclosure at different ratios and observing POM at room temperature.

The $^1$H-NMR analysis result of the TIDA prepared in Example 1 is shown in FIG. 4. The NMR analysis result of FIG. 4 is as follows.

$^1$H-NMR (400 MHz, CHCl$_3$): δ=8.9 (s, 1H), 7.3 (d, 2H), 4.3 (t, 2H), 4.1 (s, 3H), 2.2 (t, 4H), 1.2-1.6 (m, 34H), 0.8 (t, 3H).

Example 1 exemplifies the synthesis of diacetylene-based compounds containing iodide and triiodide used in the present disclosure, and Example 2 exemplifies the preparation of a mixture for a coating-type polarizing film and a coating-type polarizing film using the synthesized diacetylene-based compounds containing iodide and triiodide.

Figure 10:
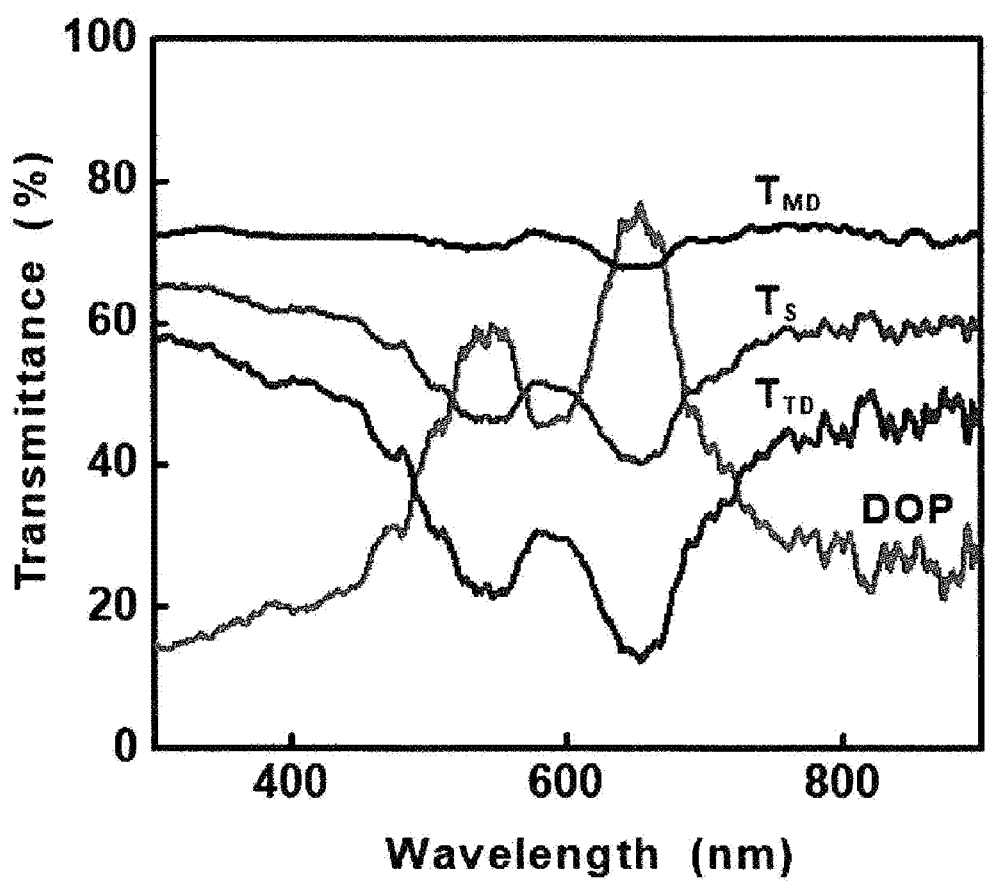
FIG. 10 shows a result of measuring the degree of polarization of a polarizing film according to an exemplary embodiment of the present disclosure.

The diacetylene-based compound containing triiodide used in the present disclosure absorbs visible light in a wavelength range of 300-400 nm, and the polydiacetylene-based polymer formed by polymerization absorbs visible light in a broad range of 400-800 nm. Accordingly, the coating-type polarizing film prepared from the mixture can absorb and pass light visible light in a wavelength range of 300-800 nm in a specific direction (see FIG. 9 and FIG. 10).

The diacetylene-based compound containing iodide and the diacetylene-based compound containing triiodide exhibit high solubility for the liquid diacetylene-based compound. Accordingly, the compounds are not phase-separated in the prepared mixture and thus increase the durability of the film. In addition, the coating-type polarizing film according to the present disclosure can be prepared into a thinner polarizing film as compared to the existing polarizing film because no additional PVA film or TAC film is necessary.

While the exemplary embodiments have been shown and described, it will be understood by those skilled in the art that various changes in form and details may be made thereto without departing from the spirit and scope of this disclosure as defined by the appended claims.

What is claimed is:

1. A lyotropic liquid crystal mixture comprising:
a compound represented by Chemical Formula 1:

   [Chemical Formula 1]

wherein A$^+$ is a linear or cyclic cationic group;
B$^-$ is an anionic group containing at least one of halogen, carbon, nitrogen, phosphorus, boron, and oxygen;
C is a C$_{1-3}$ linear group unsubstituted or substituted with oxygen or nitrogen;
D is a group containing a diacetylenyl group; and
R$_m$ or R$_n$ is a C$_{1-20}$ linear group; and
a compound represented by Chemical Formula 2:

   [Chemical Formula 2]

wherein D is a group containing a diacetylenyl group; and $R_m$ or $R_n$ is a $C_{1-20}$ linear group.

2. The lyotropic liquid crystal mixture according to claim 1, wherein the $A^+$ has a structure selected from the group consisting of Chemical Formulas 3 to 31:

[Chemical Formula 3]

[Chemical Formula 4]

[Chemical Formula 5]

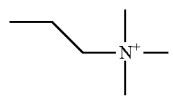
[Chemical Formula 6]

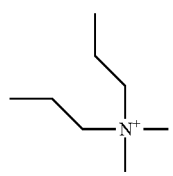
[Chemical Formula 7]

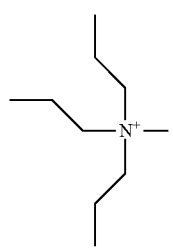
[Chemical Formula 8]

[Chemical Formula 9]

[Chemical Formula 10]

[Chemical Formula 11]

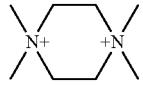
[Chemical Formula 12]

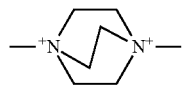
[Chemical Formula 13]

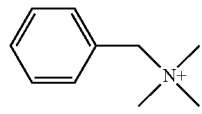
[Chemical Formula 14]

-continued

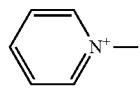
[Chemical Formula 15]

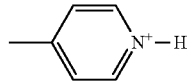
[Chemical Formula 16]

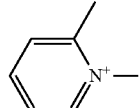
[Chemical Formula 17]

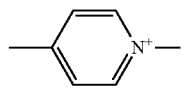
[Chemical Formula 18]

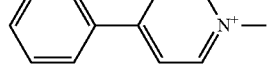
[Chemical Formula 19]

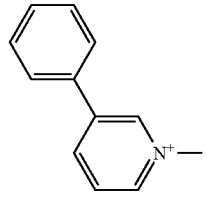
[Chemical Formula 20]

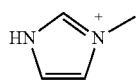
[Chemical Formula 21]

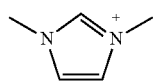
[Chemical Formula 22]

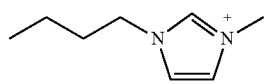
[Chemical Formula 23]

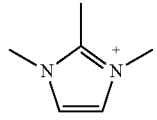
[Chemical Formula 24]

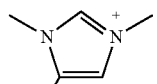
[Chemical Formula 25]

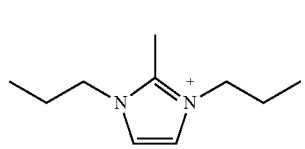
[Chemical Formula 26]

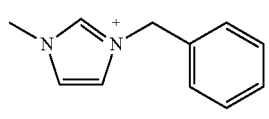
[Chemical Formula 27]

-continued

[Chemical Formula 28]

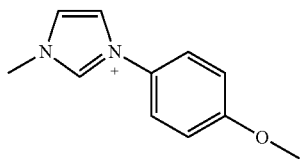

[Chemical Formula 29]

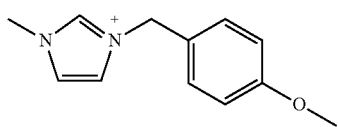

[Chemical Formula 30]

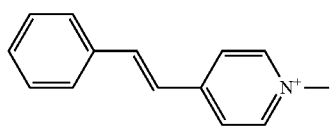

[Chemical Formula 31]

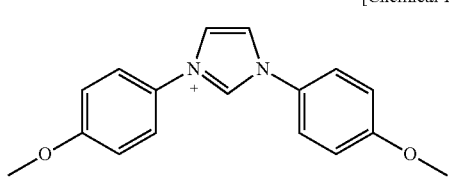

3. The lyotropic liquid crystal mixture according to claim 1, wherein the B⁻ may be Cl⁻, Br⁻, I⁻, $COOCF_3^-$, $CH_3SO_3^-$, $PO_4^-$, OH⁻, COO⁻, $NO_2^-$, $BF_4^- PF_4^-$, $NTf_2^-$, $I_3^-$, $I_5^-$ or $I_7^-$.

4. The lyotropic liquid crystal mixture according to claim 3, wherein the C has a structure selected from the group consisting of Chemical Formulas 33 to 42:

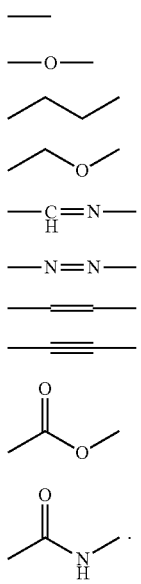

[Chemical Formula 33]
[Chemical Formula 34]
[Chemical Formula 35]
[Chemical Formula 36]
[Chemical Formula 37]
[Chemical Formula 38]
[Chemical Formula 39]
[Chemical Formula 40]
[Chemical Formula 41]
[Chemical Formula 42]

5. The lyotropic liquid crystal mixture according to claim 1, wherein the D has a structure selected from the group consisting of Chemical Formulas 43-45:

[Chemical Formula 43]

[Chemical Formula 44]

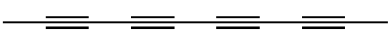

[Chemical Formula 45]

6. A method for preparing the lyotropic liquid crystal mixture according to claim 1, the method comprising:

synthesizing a compound having a structure of [X]—C—$R_m$-[D]-$R_n$ by reacting a compound having a structure of C—$R_m$-[D]-$R_n$ and X being halogen selected from the group consisting of $F_2$, $Cl_2$, $Br_2$ or $I_2$ at a molar ratio of 1:10, wherein $R_m$ and $R_n$ are each independently a $C_{1-20}$ linear group, and D is a group containing a diacetylenyl group;

synthesizing a compound having a structure of [A⁺X⁻]—C—$R_m$-D-$R_n$ by reacting the compound having the structure of [X]—C—$R_m$-[D]-$R_n$ with an A compound at a molar ratio of 1:5, wherein the A compound is a nitrogen-containing linear or cyclic compound; and synthesizing a compound having a structure of [A⁺B⁻]—C—$R_m$-D-$R_n$ compound by reacting the compound having the structure of [A⁺X⁻]—C—$R_m$-D-$R_n$ compound with a B2 compound at a molar ratio of 1:5, wherein the B2 compound is a halogen compound selected from the group consisting of $F_2$, $Cl_2$, $Br_2$ and $I_2$.

7. A polarizing film composition comprising the lyotropic liquid crystal mixture according to claim 1.

8. The polarizing film composition according to claim 7, wherein the polarizing film composition comprises 60-90 parts by weight of a diacetylene-based compound comprising iodide, 1-30 parts by weight of a diacetylene-based compound comprising triiodide and 1-20 parts by weight of a liquid diacetylene-based compound.

9. The polarizing film composition according to claim 8, wherein the diacetylene-based compound comprising iodide absorbs visible light in a wavelength range of 1-200 nm, the diacetylene-based compound comprising triiodide absorbs visible light in a wavelength range of 300-400 nm, and the polarizing film composition absorbs visible light in a wavelength range of 300-800 nm.

10. The polarizing film composition according to claim 8, wherein the polarizing film composition is a smectic liquid crystal.

11. A polydiacetylene, which is a conjugated polymer, formed by polymerizing the polarizing film composition according to claim 8 using 254-nm ultraviolet light.

* * * * *